(12) United States Patent
Singh

(10) Patent No.: US 10,963,231 B1
(45) Date of Patent: Mar. 30, 2021

(54) USING ARTIFICIAL INTELLIGENCE TO SELECT AND CHAIN MODELS FOR ROBOTIC PROCESS AUTOMATION

(71) Applicant: UiPath, Inc., New York, NY (US)

(72) Inventor: Prabhdeep Singh, Bellevue, WA (US)

(73) Assignee: UiPath, Inc., New York, NY (US)

( * ) Notice: Subject to any disclaimer, the term of this patent is extended or adjusted under 35 U.S.C. 154(b) by 13 days.

(21) Appl. No.: 16/707,933

(22) Filed: Dec. 9, 2019

Related U.S. Application Data

(60) Provisional application No. 62/915,399, filed on Oct. 15, 2019.

(51) Int. Cl.
| | |
|---|---|
| *G06F 8/60* | (2018.01) |
| *G06F 11/34* | (2006.01) |
| *G06N 20/00* | (2019.01) |

(52) U.S. Cl.
CPC ............ *G06F 8/60* (2013.01); *G06F 11/3466* (2013.01); *G06N 20/00* (2019.01)

(58) Field of Classification Search
None
See application file for complete search history.

(56) References Cited

U.S. PATENT DOCUMENTS

| | | |
|---|---|---|
| 7,480,640 B1 | 1/2009 | Elad et al. |
| 2016/0358099 A1 | 12/2016 | Sturlaugson et al. |
| 2016/0364647 A1 | 12/2016 | Achin et al. |
| 2017/0364831 A1 | 12/2017 | Ghosh et al. |
| 2018/0329399 A1* | 11/2018 | Neelakandan ... G06Q 10/06315 |
| 2018/0370029 A1* | 12/2018 | Hall ........................ G06F 9/451 |
| 2019/0057203 A1* | 2/2019 | Buddhiraju ........... G06F 21/602 |
| 2019/0138946 A1 | 5/2019 | Asher et al. |
| 2019/0155225 A1* | 5/2019 | Kothandaraman .... G06N 20/00 |
| 2019/0156247 A1 | 5/2019 | Faulhaber, Jr. et al. |
| 2019/0180746 A1* | 6/2019 | Diwan ..................... G10L 15/22 |
| 2019/0332508 A1* | 10/2019 | Goyal ................. G06F 11/0757 |
| 2020/0012962 A1* | 1/2020 | Dent ..................... G06F 9/5011 |

(Continued)

FOREIGN PATENT DOCUMENTS

| | | |
|---|---|---|
| KR | 1020180130925 A | 12/2018 |
| KR | 20190094133 A | 8/2019 |
| WO | 2019186194 A2 | 10/2019 |

OTHER PUBLICATIONS

Workfusion "9 AI trends to look for in 2018 RPA 2.0 initiatives" page available at https://www.rpaforum.net/threads/9-ai-trends-to-look-for-in-2018-rpa-2-0-initiatives.447/ (published Nov. 10, 2017).

(Continued)

*Primary Examiner* — Qing Chen
(74) *Attorney, Agent, or Firm* — LeonardPatel PC; Michael A. Leonard, II; Sheetal S. Patel

(57) ABSTRACT

Using artificial intelligence (AI) to select and/or chain robotic process automation (RPA) models a given problem is disclosed. A model of models (e.g., an RPA robot or an ML model) may serve as an additional layer on an existing system that makes the existing models more effective. This model of models may incorporate AI that learns an improved or best set of rules or an order from existing models, potentially taking certain activities from a model, feeding input from one model into another, and/or chaining models in some embodiments.

7 Claims, 7 Drawing Sheets

(56) References Cited

U.S. PATENT DOCUMENTS

2020/0206920 A1* 7/2020 Ma ..................... G06F 11/3476
2020/0364083 A1* 11/2020 Walby .................. G06F 9/4881

OTHER PUBLICATIONS

International Search Report and Written Opinion of the International Search Authority for PCT Application No. PCT/US2020/046772 issued by the Korean Intellectual Property Office (KIPO) dated Dec. 3, 2020.

* cited by examiner

USING ARTIFICIAL INTELLIGENCE TO SELECT AND CHAIN MODELS FOR ROBOTIC PROCESS AUTOMATION

CROSS-REFERENCE TO RELATED APPLICATION

This application claims the benefit of U.S. Provisional Patent Application No. 62/915,399 filed Oct. 15, 2019. The subject matter of this earlier filed application is hereby incorporated by reference in its entirety.

FIELD

The present invention generally relates to robotic process automation (RPA), and more specifically, to using artificial intelligence (AI) to select and/or chain models for RPA.

BACKGROUND

Typically, a single RPA workflow is built and deployed in a single robot to perform certain tasks under certain conditions. For instance, a robot may be built and deployed that looks for certain visual components in an image, pulls certain information from an invoice, etc. However, without continuously building new rules based on changes to the current problem or understanding which activities are working properly, new changes may not be recognized, or the robot may fail altogether. Furthermore, a single robot may not be optimal for all scenarios. Accordingly, an improved approach may be beneficial.

SUMMARY

Certain embodiments of the present invention may provide solutions to the problems and needs in the art that have not yet been fully identified, appreciated, or solved by current RPA technologies. For example, some embodiments of the present invention pertain to using AI to select and/or chain models for RPA.

In an embodiment, a computer-implemented method for using AI to select and/or chain ML models for RPA includes executing, by a computing system, a model of models that analyzes performance of individual ML models and chains of ML models in an ML model pool to be called in a workflow of an RPA robot. When superior performance to an existing ML model or chain of ML models is discovered by the model of models, the computer-implemented method also includes deploying the discovered ML model or chain of ML models, by the computing system, thereby replacing the existing ML model or chain of ML models.

In another embodiment, a computer-implemented method for using AI to select and/or chain ML models for RPA includes executing a model of models that analyzes performance of individual ML models and chains of ML models in an ML model pool to be called in a workflow of an RPA robot. When superior performance to an existing ML model or chain of ML models is discovered by the model of models, the computer-implemented method also includes deploying the discovered ML model or chain of ML models, thereby replacing the existing ML model or chain of ML models, and modifying the workflow of the RPA robot to call the discovered ML model or chain of ML models.

In yet another embodiment, a computer-implemented method for using AI to chain ML models for RPA includes executing a model of models that analyzes performance of chains of ML models in an ML model pool to be called in a workflow of an RPA robot. When superior performance to an existing ML model or chain of ML models is discovered by the model of models, the computer-implemented method also includes deploying the discovered chain of ML models, thereby replacing the existing ML model or chain of ML models, and modifying the workflow of the RPA robot to call the discovered chain of ML models. The analysis of the performance of the chains of ML models includes performing AI-based experimentation on permutations of chained ML models in series, in parallel, or a combination thereof, and analyzing results output by the chains of ML models.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
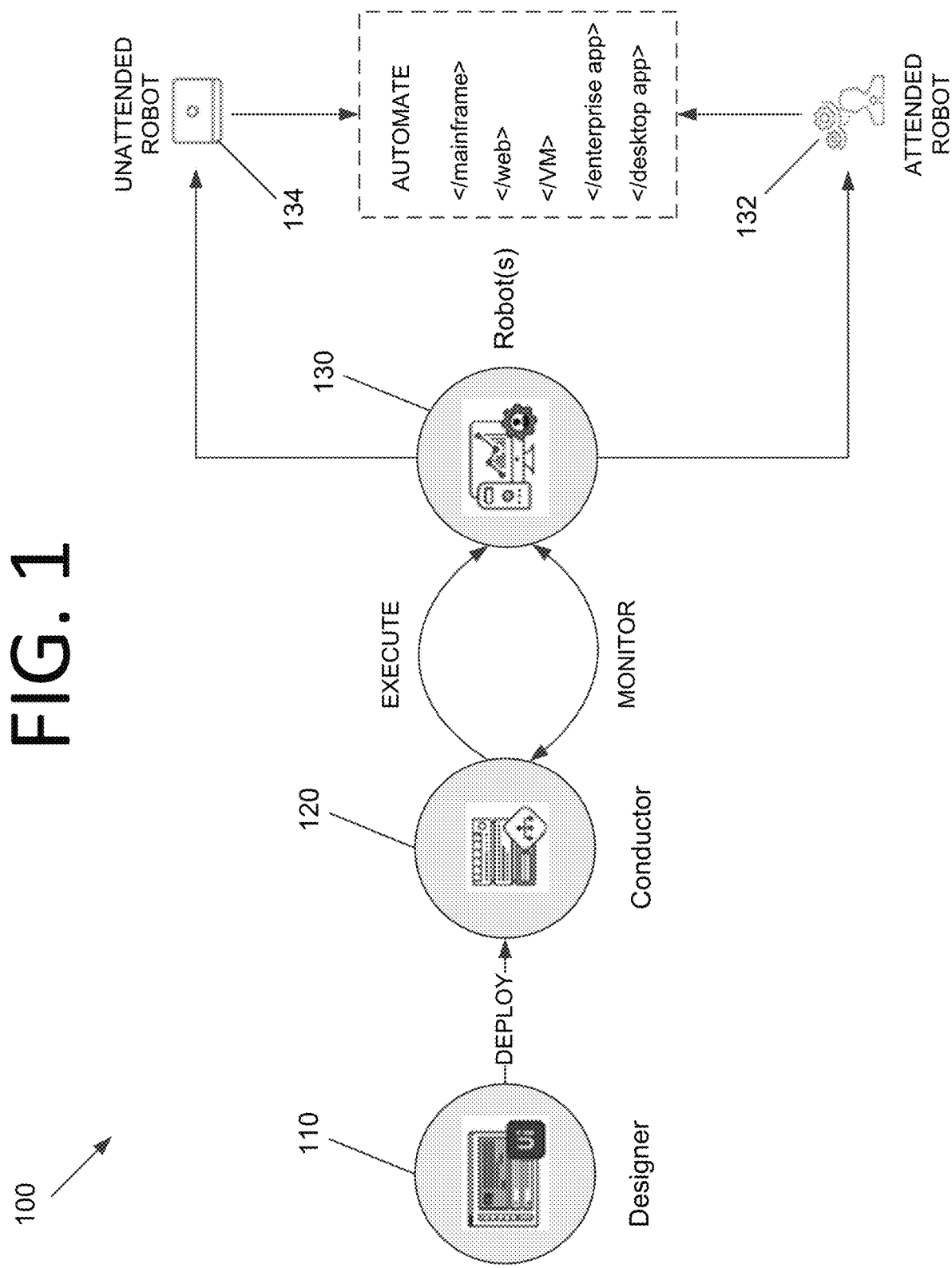
FIG. 1 is an architectural diagram illustrating an RPA system, according to an embodiment of the present invention.

Some embodiments pertain to selecting models and/or chaining multiple models for a given problem to create more optimized model performance for the problem via a "model of models". In some embodiments, the model of models could be an RPA robot or could itself be an ML model called by an RPA robot. Such a model of models may serve as an additional layer on an existing system that makes the existing models more effective. This model of models may incorporate AI that learns an improved or best set of rules and/or an order from existing models, potentially determining a best performing model from a model pool, taking certain activities from a model, feeding input from one model into another, and/or chaining models in some embodiments. In certain embodiments, the model of models may search a relatively large number of existing models (e.g., 5, 10, 50, 100 or more, etc.) and apply at least some of these models to produce a superior outcome.

Consider the case of deploying software for performing automated flight control in an aircraft or drone. Various sensors provide different readings, and it may be desirable to determine how do these inputs may be used to select an appropriate model to invoke. For example, to turn the aircraft or drone, should ailerons alone be used or would some combination of flight control surfaces perform better? The model of models may determine which model(s) to select, and this selection may be governed by a reward function. A reward function explores intermediate transitions and steps with both short term and long term rewards to guide the search of a state space and attempt to achieve a goal (e.g., improved fuel efficiency, successfully executed control maneuvers, etc.).

In some embodiments, a process mining/task mining system may collect logs for the different steps that the user uses in a workflow. These logs can be analyzed by the process mining system to reveal patterns of usage and what are called process flow diagrams. In certain embodiments, the system can take the input from the process logs and/or the process flow diagrams to propose the AI models that can result in optimization of that workflow/process.

Where multiple models are chained, these models could be executed in series, in parallel, or a combination thereof. For instance, consider an embodiment that is chaining four models. In a series implementation, data may be run through model 1, its output run through model 2, its output run through model 3, and its output run through model 4, producing the final output of the chain. In a parallel implementation, the data may be run through models 1-4 individually. In a combination implementation, the data may be fed through models 1 and 2 in series and then the output of model 2 run through models 3 and 4 in parallel, the data could be run though models 1 and 2 in parallel and the output from each of models 1 and 2 could be fed through models 3 and 4 in series, etc.

For instance, in sales, if a software application provides recommendations for salespeople, one model may consider at what types of leads have been most successful and a second model may look at what applications the users are using. Based on recommendations from each, one could monitor whether there is an increase in revenue, a decrease in revenue, or revenue stays the same. Experimentation could then be performed to see whether chaining the outputs of the models leads to an improvement (e.g., testing the most successful lead types with different applications that salespeople are using).

Consider the case of invoice processing. For a serial implementation, an invoice processing model of models may first run a model that decides whether an email contains an invoice at all, classifying what the email contains. In the case that an invoice is determined to be present, a second model may be an extractor that extracts invoice content.

In certain embodiments, input from a user of a computing system is considered by the model of models to determine whether an underlying model is not operating correctly or is operating incorrectly in a given scenario. The model of models may also determine which of the underlying models is operating correctly in a given scenario. The determination of which model(s) to be used may be made via A/B testing, canary testing, etc.

In operation, the model of models may compare a given existing model against a confidence threshold that is specific to that model, shared in common by multiple models, shared in common by all models, etc. For example, models that perform a highly sensitive process, such as mission critical systems in an aircraft, accounting operations, etc., may have a higher confidence threshold for success. However, less sensitive models, such as those for performing invoice processing, may have a lower confidence threshold.

In certain embodiments, the model of models may modify the confidence threshold for one or more underlying models based on observed performance at that threshold. For example, if the confidence threshold for an underlying image analysis model is not returning any results, the threshold may be lowered. Alternatively, if false positives are being provided by the model, the threshold may be raised. Thus, the confidence threshold may be changed depending on the requirements of the underlying models managed by the model of models.

Using sales as an example, there may be multiple models. For instance, there may be a model for providing the best leads possible, another model that detects customers that will leave, and so forth. These models may not know how good they are, but the models may still provide recommendations to users. These recommendations allow the user to see the effects as a reward function.

For example, a model that predicts new leads may not be effective. However, a model that predicts whether a customer will leave soon, and potentially offers suggestions of actions to keep the customer from leaving, may be very valuable. To create a model that predicts whether a customer may leave, N new machine learning models may be tested and compared with each other to see how successful they are. By comparing these models, AI can be applied to learn how to chain the models together to obtain a better result, how to use the models in different combinations, etc., thereby creating a model of models that is more effective than any single model alone.

Consider the example of a policy network. In this example, if a positive delta from the reward function is not being received from testing of the different models, then AI may be used to chain the models together and try a different order of models to see if there is an improvement. If there is a model, for example, that knows how to identify new leads and there is another model that can detect bogus email addresses, AI may be used to learn to execute the dubious email checker before the new lead identification model, and feed the email addresses left over after the dubious email checker is run into the new lead identification model. This logic could then be deployed to kick out bogus (or spam) emails before checking for leads. The AI may thus determine the order of using the models and the data that should be provided thereto and therebetween to improve efficiency as a model of models.

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended Robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™ In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
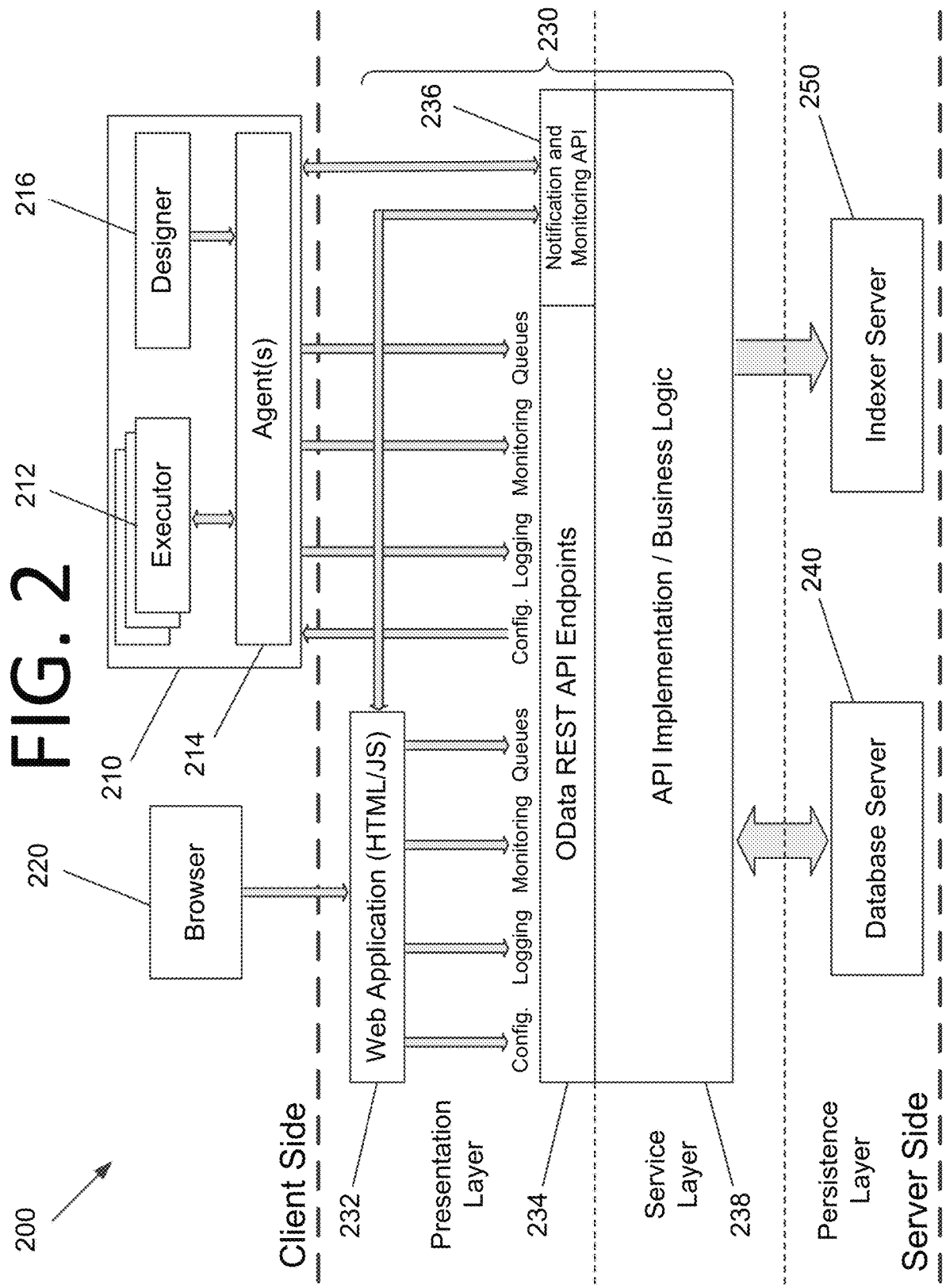
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), there multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 220 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring rest endpoints monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment-database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
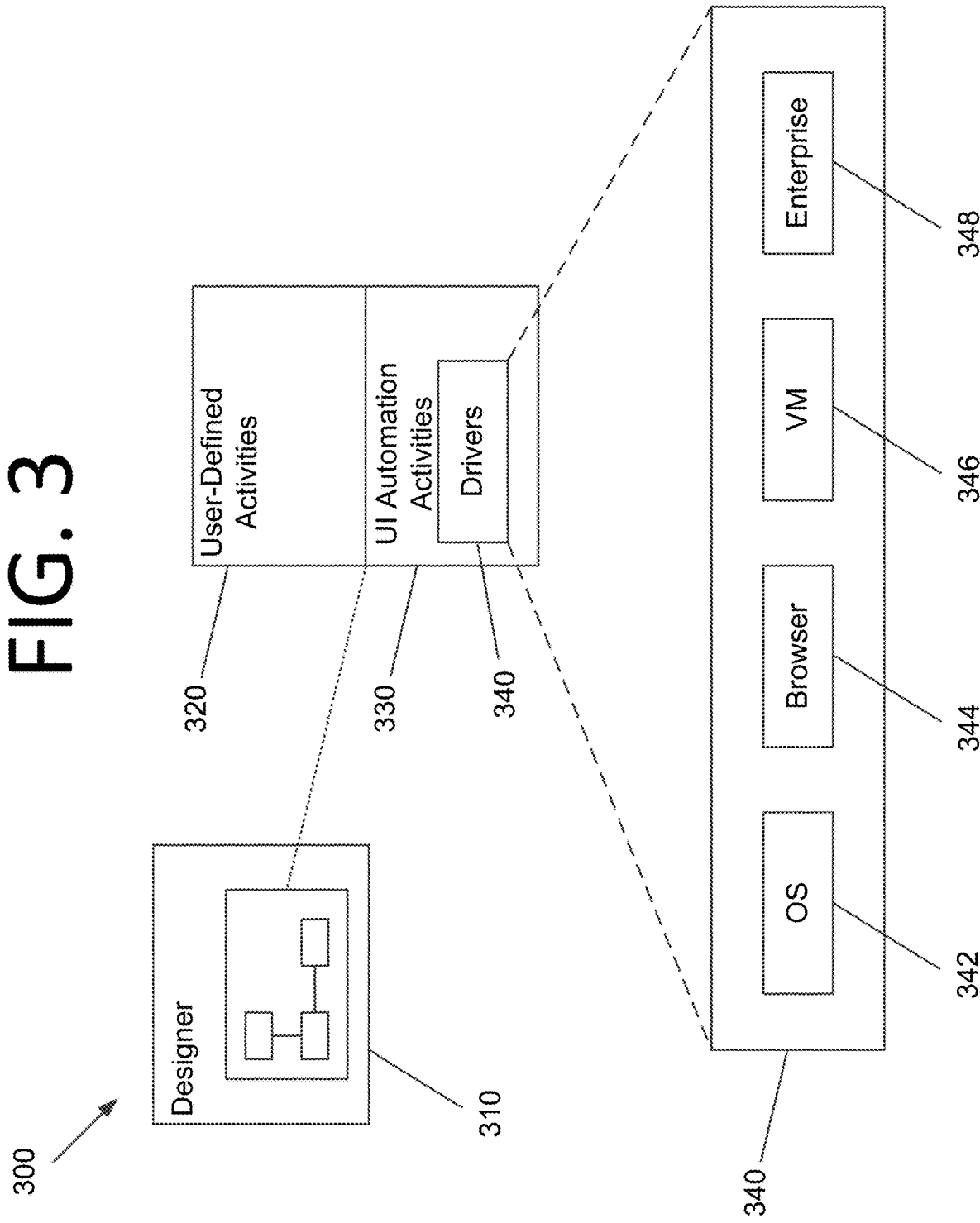
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
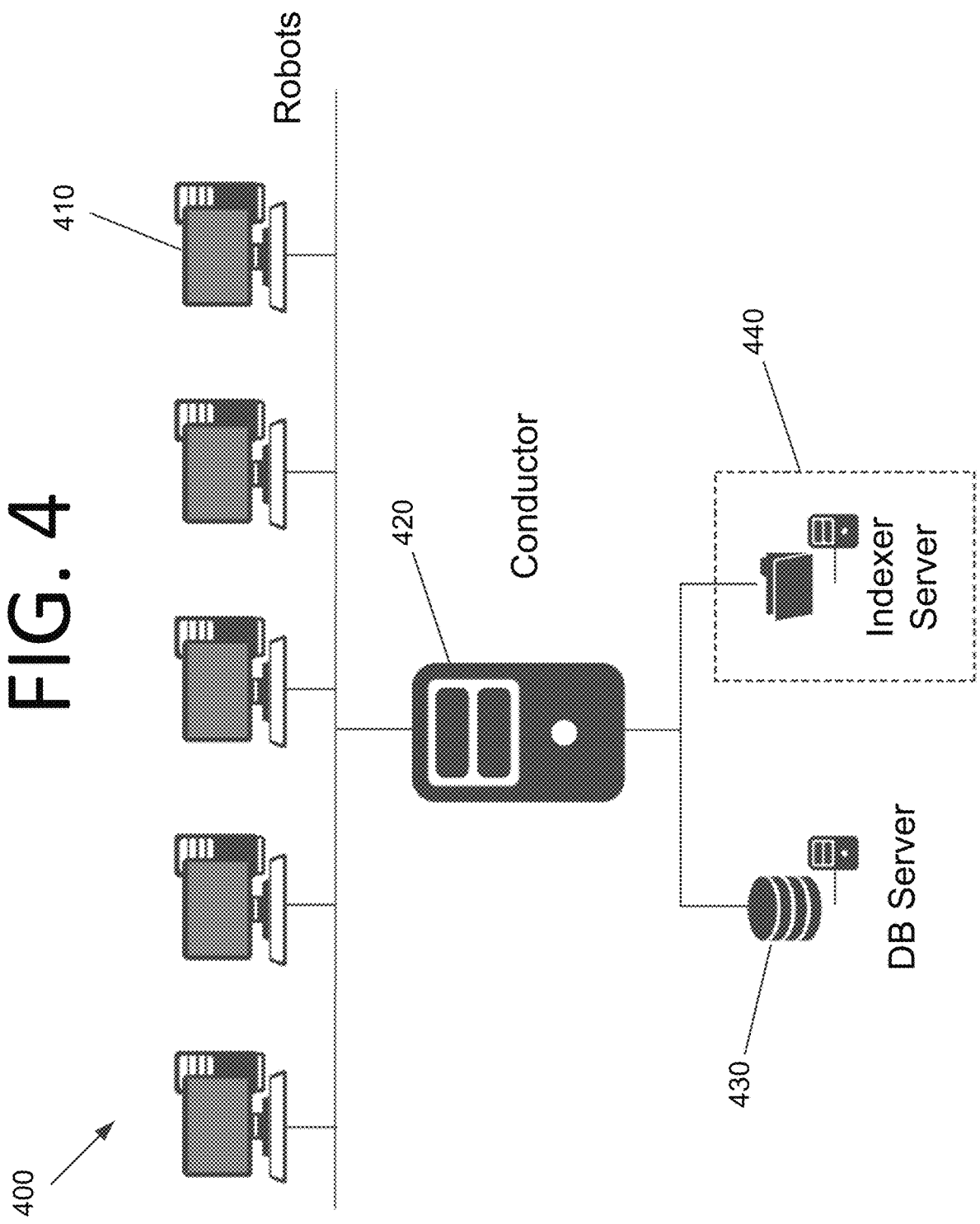
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
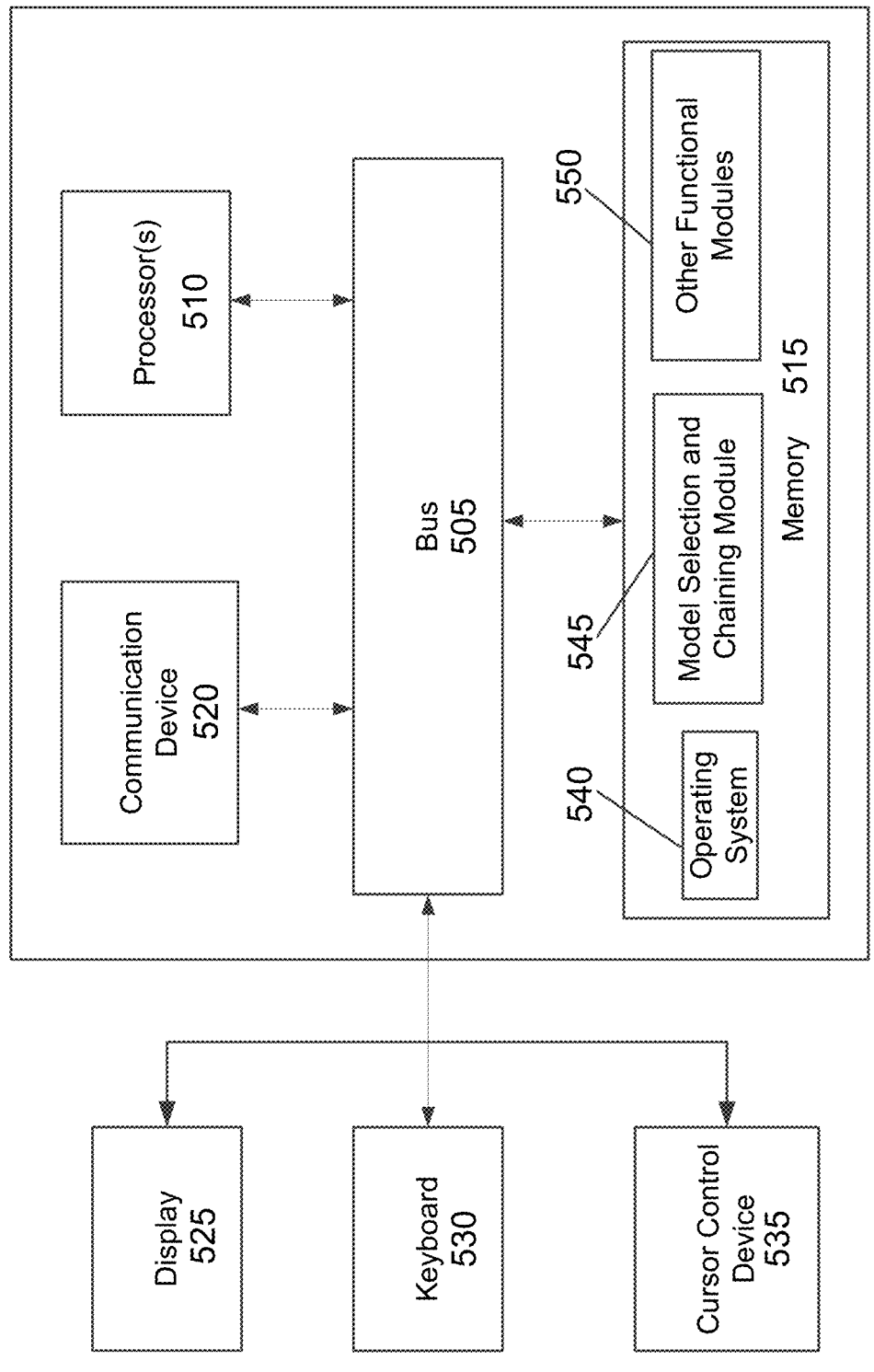
FIG. 5 is an architectural diagram illustrating a computing system configured to use AI to select and chain models for RPA models for RPA, according to an embodiment of the present invention.

FIG. 5 is an architectural diagram illustrating a computing system 500 configured to use AI to select and chain models for RPA models for RPA, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a model selection and chaining module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
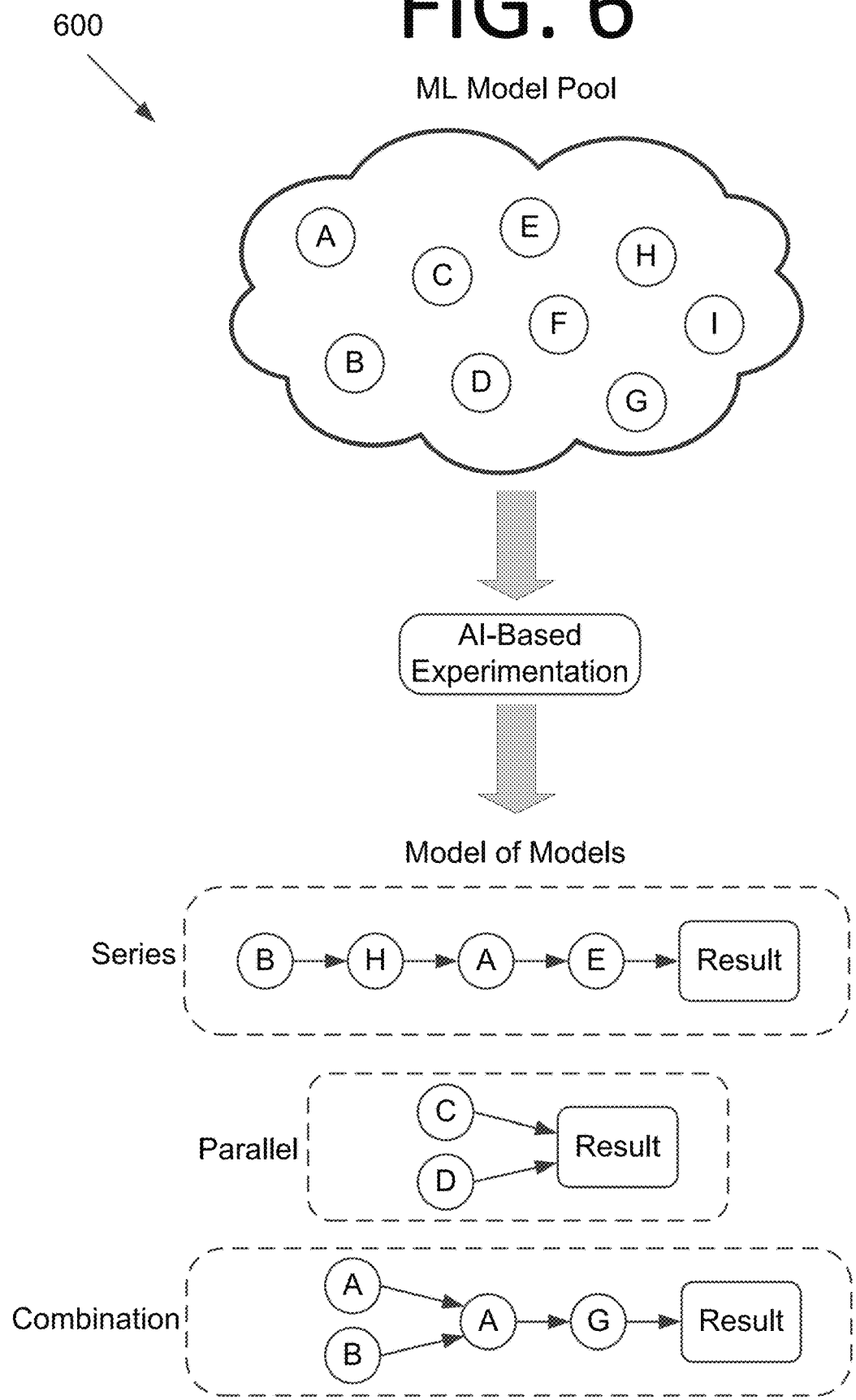
FIG. 6 illustrates a process for using a "model of models" that performs experimentation to chain multiple models and achieve a better outcome, according to an embodiment of the present invention.

FIG. 6 illustrates a process 600 for using a "model of models" that performs experimentation to chain multiple models and achieve a better outcome, according to an embodiment of the present invention. In this example, a model pool of different trained ML models (i.e., ML models A through I) exists for various tasks. AI-based experimentation is then performed on various permutations of chained ML models (possibly including testing including the same model in a chain more than once). ML models may be run in series, in parallel, or a combination thereof (potentially alternating between series and parallel multiple times). When a chain of ML models is discovered that has a superior outcome for a given problem, this chain is output as a model of models that can be deployed an applied to that problem. As depicted, this chain may be in series, parallel, or a combination thereof. Indeed, any permutation or combination may be identified and used without deviating from the scope of the invention. Also, in certain embodiments, a single model may be identified as optimal over any chain and selected.

Figure 7:
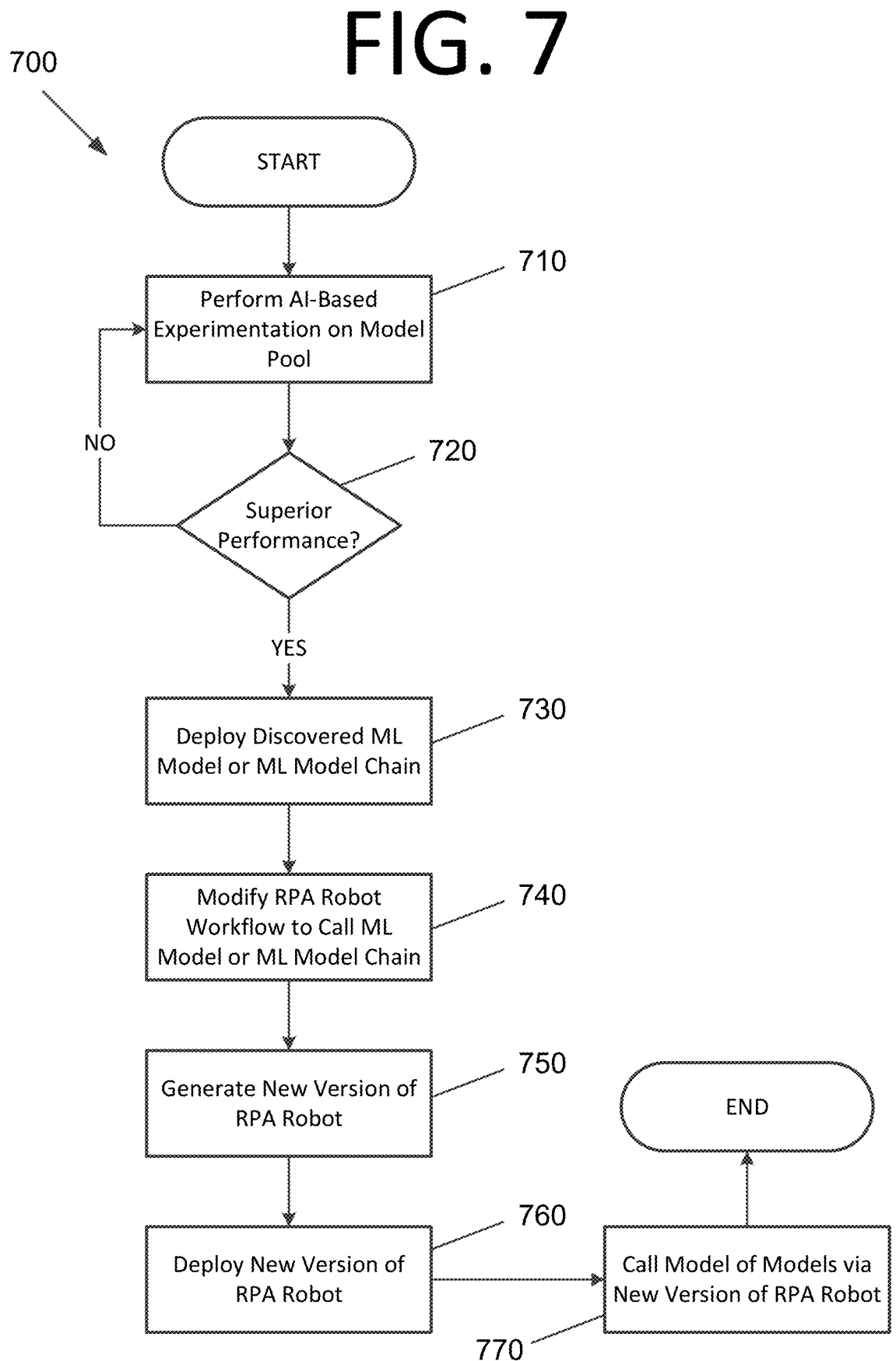
FIG. 7 is a flowchart illustrating a process for using AI to select and/or chain models for RPA, according to an embodiment of the present invention.

FIG. 7 is a flowchart illustrating a process 700 for using AI to select and/or chain models for RPA, according to an embodiment of the present invention. The process begins with performing AI-based experimentation on an ML model pool at 710 by executing a "model of models" that analyzes performance of individual ML models and chains of ML models in the ML model pool. In some embodiments, a process sniffing/process mining system may be used to analyze the user workflows and determine the different AI models that can be incorporated in those workflows. When superior performance to an existing ML model or chain of ML models is not discovered from a single ML model or chaining multiple ML models (e.g., in serial, in parallel, a combination thereof, alternating series and/or parallel portions of the chain, etc.) at 720, the search for superior ML models and/or combinations continues at 710.

However, when an ML model or a combination of ML models chained in a certain configuration is discovered at 720, this ML model or chain of ML models is deployed at 730. An RPA robot workflow is modified at 740 to call the new ML model or chain of ML models and apply the ML model or chain of ML models to a given task. A new version of the RPA robot is then generated at 750 and deployed at 760. The new version of the RPA robot then calls the ML model or chain of ML models during their operation at 770.

The process steps performed in FIG. 7 may be performed by a computer program, encoding instructions for the processor(s) to perform at least part of the process(es) described in FIG. 7, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 7, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A computer-implemented method for using artificial intelligence (AI) to chain machine learning (ML) models for robotic process automation (RPA), comprising:
   executing a model of models that analyzes performance of individual ML models and chains of ML models in an ML model pool to be called in a workflow of an RPA robot; and
   when superior performance outcome to an existing ML model or chain of ML models is discovered by the model of models:
      deploying the discovered ML model or chain of ML models, thereby replacing the existing ML model or chain of ML models, and
      modifying the workflow of the RPA robot to call the discovered ML model or chain of ML models, wherein
   the analysis of the performance of the individual ML models and chains of ML models comprises performing AI-based experimentation on permutations of chained ML models in series, in parallel, or a combination thereof, and analyzing results output by the individual ML models and chains of ML models.

2. The computer-implemented method of claim 1, further comprising:
   generating a new version of the RPA robot that implements the modified workflow of the RPA robot; and
   deploying the generated new version of the RPA robot.

3. The computer-implemented method of claim 2, further comprising:
   calling the discovered ML model or chain of ML models, by the generated new version of the RPA robot, when executing the modified workflow of the RPA robot.

4. The computer-implemented method of claim 1, wherein the permutations of chained ML models comprise multiple instances of a same ML model in a chain of ML models.

5. The computer-implemented method of claim 1, wherein the superior performance outcome is governed by a reward function that explores intermediate transitions and steps with rewards to guide a search of a state space and an attempt to achieve a goal.

6. The computer-implemented method of claim 1, wherein at least one permutation of chained ML models in series and in parallel comprises alternating between ML models in series and in parallel.

7. The computer-implemented method of claim 1, wherein the model of models is an ML model or an RPA robot.

* * * * *